United States Patent [19]
Mitchell

[11] 3,871,066
[45] Mar. 18, 1975

[54] COMBINED CUTTER AND GRINDER ATTACHMENT FOR LATHE

[75] Inventor: Wallace F. Mitchell, Mettawa, Ill.

[73] Assignee: Ammco Tools, Inc., North Chicago, Ill.

[22] Filed: Feb. 7, 1974

[21] Appl. No.: 440,587

[52] U.S. Cl............ 29/560, 29/28, 82/2 A, 82/4 A
[51] Int. Cl...... B23p 23/00, B23b 25/00, B23b 5/02
[58] Field of Search.......... 29/560, 28; 82/4 A, 2 A, 82/2 J, 36, 38; 408/180, 187

[56] References Cited
UNITED STATES PATENTS

| | | | |
|---|---|---|---|
| 2,367,137 | 1/1945 | Olsson | 29/28 |
| 2,933,801 | 4/1960 | Rush | 29/28 X |
| 2,960,765 | 11/1960 | Barrett | 82/4 A X |
| 3,535,963 | 10/1970 | Dietl | 82/38 |
| 3,626,793 | 12/1971 | Rice | 82/4 A |
| 3,710,661 | 1/1973 | Mitchell | 82/4 A |

*Primary Examiner*—Andrew R. Juhasz
*Assistant Examiner*—Leon Gilden
*Attorney, Agent, or Firm*—Edmond T. Patnaude

[57] ABSTRACT

There is described a tool holder attachment for a brake drum lathe which permits use of the lathe for facing brake discs as well as for grinding brake drums and other rotors.

7 Claims, 2 Drawing Figures

COMBINED CUTTER AND GRINDER ATTACHMENT FOR LATHE

The present invention relates in general to tool holder attachments for use with brake drum type lathes as used in automotive repair shops, and it relates more particularly to a single tool holder attachment adapted to be used for machining the faces of brake discs and the like and also for grinding brake drums, fly wheels and similar rotors.

BACKGROUND OF THE INVENTION

The tool holder attachment of the present invention is an improvement of the device disclosed in my copending application Ser. No. 216,484, now Pat. No. 3,813,970, filed Jan. 10, 1972 and assigned to the same assignee as the present invention. Unlike the earlier device, the present tool holder may be used both for machining as well as grinding. In the prior art, separate attachments were required for these two different type operations thereby increasing the set up time for each job. While larger repair shops may have two lathes, one set up for brake drum grinding and the other set up for brake disc grinding, many shops have but one lathe which must be used for both purposes. The tool holder attachment of the present invention finds particular application in these smaller shops where versatility of the brake drum lathe is of particular importance. Of course, this improved tool holder also finds application in the larger shops.

OBJECTS OF THE INVENTION

The principal object of the present invention is to provide a new and improved tool holder which will enable precision machining of brake discs and grinding of brake drums.

Another object of this invention is to provide a tool holder attachment which provides a sturdy support for a grinder attachment in the crossfeed mechanism of a lathe.

SUMMARY OF THE INVENTION

Briefly, the above and further objects may be realized in accordance with the teachings of the present invention by providing a base which is mountable on the crossfeed mechanism of the lathe and on which is supported a carriage carrying a pair of tool bars having cutting bits attached to the ends thereof and a saddle clamp for rigidly holding the quill of a self-contained motor driven grinder attachment. The carriage is adjustable on the base by a hand wheel driven lead screw for precise adjustment of the position of the tool bit and for feeding the grinding wheel toward the work surface during the grinding operation. The grinder attachment is of the type disclosed in my copending application Ser. No. 311,124, now U.S. Pat. No. 3,828,487, filed Dec. 1, 1972.

BRIEF DESCRIPTION OF THE DRAWINGS

Further objects and advantages and a better understanding of the present invention can be had by reference to the following detailed description, wherein.

DETAILED DESCRIPTION OF THE INVENTION

Figure 1:
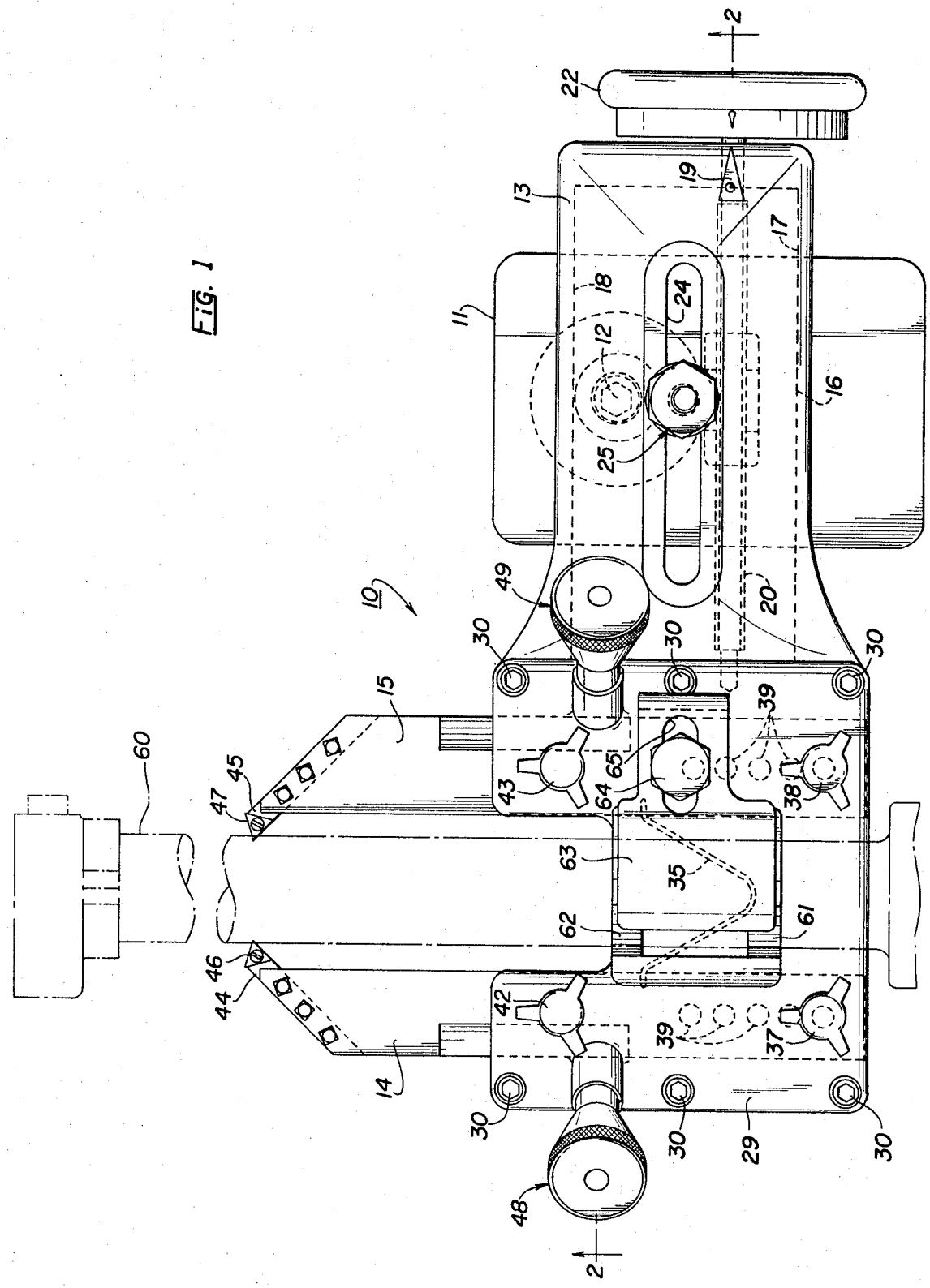
FIG. 1 is a plan view of a tool holder attachment of the present invention.
Figure 2:
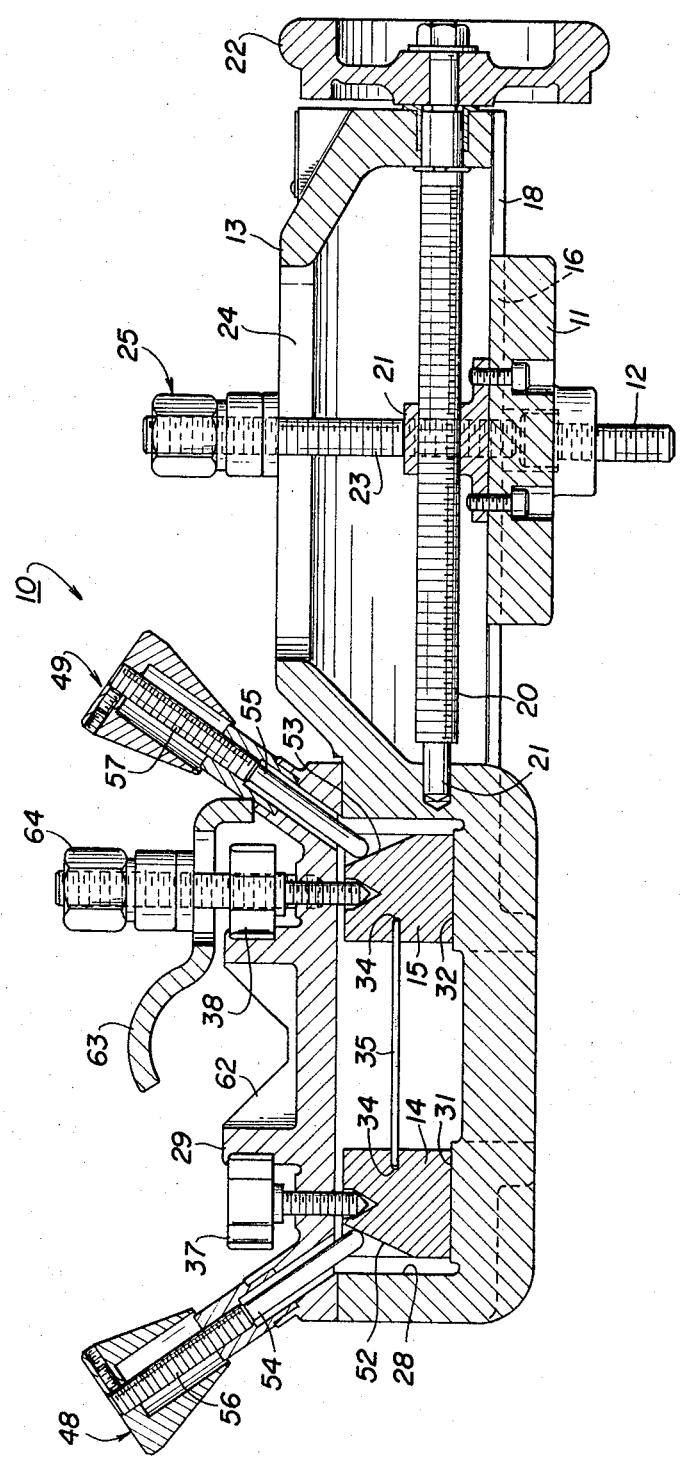
FIG. 2 is a vertical sectional view of the device of FIG. 1 taken along the line 2—2 thereof.

Referring now to the drawings, a tool holder attachment 10 comprises a base plate 11 adapted to be mounted to the crossfeed mechanism of a lathe and fixedly secured thereto by a bolt 12. A carriage 13 in the form of a metal casting is slidably supported on the base plate 11 and as more fully described hereinafter carries a pair of tool bars 14 and 15. The base plate 11 has a raised central section 16 which is slidably received in a pair of ways 17 and 18 in the carriage. A lead screw 20 is rotatably supported at its distal end 21 in a complementary hole in the carriage 13 and journaled near its other end in the end wall of the carriage 13. The lead screw 20 is threadedly received in a lead screw nut 21 bolted to the top of the support plate 11. A hand wheel 22 fastened to the outer end of the lead screw 20 permits the operator to manually rotate the lead screw to move the carriage 13 in a direction parallel to the spindle of the lathe. A reference pointer 19 is mounted on the carriage adjacent the handwheel on which a reference mark 21 is provided for facilitating setting of the hand wheel.

The carriage 13 is secured to the base plate 11 by means of a threaded stud or bolt 23 which is connected at its bottom to the plate 11 and extends upwardly through an elongated slot 24 in the carriage member. A nut and washer assembly 25 fits over the upper end of the stud 23 and when tightened locks the carriage 13 in the adjusted position to the base member 11.

The carriage is provided with an upwardly opening recess 28 over which a cover member 29 is secured by a plurality of screws 30. A pair of laterally extending elongated flat ground guide surfaces 31 and 32 are provided on the carriage at the bottom of the recess and the pair of tool bars 14 and 15 are respectively supported thereon. As shown, the tool bars each have a flat bottom surface which lies on the associated flat guide surface of the carriage. The tool bars each have a hole 34 respectively receiving the distal end portions of a generally triangular spring 35 which resiliently biases the tool bars away from one another. The tool bars are pivotally mounted on the guide surfaces 14 and 15 by means of a pair of adjustable pivot members 37 and 38 which are threadedly received in holes in the coverplate 29 with the inner ends of the pivot members extending into selected ones of a plurality of circular recesses 39 in the bars 14 and 15. The recesses 39 are aligned with the longitudinal axes of the tool bars and permit adjustment of the longitudinal positions of the tool bars. A pair of thumb screws 42 and 43 are threadedly received in openings in the coverplate and may be tightened against the tool bars to lock the tool bars in the angularly adjusted positions.

The tool bars have tool bit holders 44 and 45 mounted at an angle at the ends thereof for holding a pair of cutting bits 46 and 47 against a workpiece (not shown). Lateral adjustment of these cutting bits is provided by a pair of identical depth of cut adjustment assemblies 48 and 49 mounted to the coverplate 29. More particularly, the tool bars 14 and 15 have angularly disposed upper side wall portions 52 and 53 against which a pair of rods 54 and 55 are respectively adapted to be pressed by associated control screws 56 and 57. With the screws 37, 38, 42 and 43 loosened, the knobs on the screws 56 and 57 may be rotated to pivot the tool bars 14 and 15 about the respective axes of the screws 37 and 38 against the outward biasing force exerted by the spring 35. When thus adjusted, the screws are tightened to lock the tool bars in the adjusted positions.

In order to support a grinder attachment 60, the cover plate 29 is provided with a centrally disposed saddle provided by a pair of spaced apart upstanding flanges 61 and 62 each having a recess in the tip thereof defined by a plurality of flats. These flanges are disposed a substantial distance above the tool bars so that these bars do not interfere with the grinder attachment. Moreover, the flanges are equally spaced from the longitudinal axis of the slot 24. A clamp member 63 is secured to the carriage member over the saddle by means of a nut and bolt assembly 64 which extends through a slot 65 in the clamp member and is threadedly received in an opening in the top of the coverplate 29 midway between the screws 38 and 43.

For use in a grinding operation, the quill of the grinder attachment as shown in phantom is inserted in the saddle under the clamp member 63 and axially moved to locate the grinding head at the desired position relative to the rotor to be ground. The nut and bolt assembly is then tightened to fixedly secure the quill and thus the grinder attachment in place. The handwheel 22 is then operated to adjust the position of the grinding head parallel to the axis of the lathe spindle. When brake discs are to be machined, the grinder attachment is simply removed from the saddle.

The present invention thus provides a combined machining bit and grinding attachment lathe accessory wherein an adjustable, yet rigid support is provided for the grinder attachment as well as for the tool bits. The need for the two separate attachments of the prior art is thus obviated.

While the present invention has been described in connection with a single embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A cutter and grinder attachment for a lathe having a base and a workpiece supporting spindle rotatably mounted to said base, the combination comprising
a base member adapted to be mounted to the base of said lathe for controlled movement toward and away from said spindle,
a tool holding carriage slidably mounted to said base member for rectilinear movement in a direction parallel to the axis of said spindle,
a pair of tool bars each having means thereon for receiving a cutting tool,
said carriage having coplanar upper surfaces on which planar surfaces of said tool bars are supported,
first and second adjustable pivot means depending from said fixture into respective recesses in the tops of said tool bars disposed on said planar surfaces of said fixture,
spring means interposed between said tool bars for biasing said cutting tools in opposite directions away from a workpiece carried by said spindle,
depth of cut adjustment means carried by said carriage for respectively pivoting said tool bars against the force of said spring,
a saddle on said carriage positioned above and between said coplanar surfaces,
a saddle clamp on said carriage positioned above said saddle for clamping the quill of a grinder in said saddle, and
a lead screw threadedly connected between said carriage and said base member for controllably moving said fixture parallel to said spindle.

2. The combination according to claim 1 wherein said tool bars are removable from said carriage.

3. The combination according to claim 2 wherein said carriage is provided with a coverplate overlying said tool bars and in which said depth of cut adjustments means are threadedly mounted, said saddle being provided on the top of said cover plate.

4. The combination of claim 3 wherein said base member and said cover plate define a channel open at both ends and through which said tool bars are removable.

5. The combination of claim 4 wherein said spring means is received in inwardly facing recesses in said tool bars and is removable from said carriage with said tool bars.

6. An attachment according to claim 5 wherein said carriage is provided with an elongated slot extending parallel to said rectilinear direction, and a bolt extending through said slot into threaded engagement with said base member for locking said carriage in the adjusted position on said base member.

7. An attachment according to claim 6 wherein said saddle recess is symmetrical with respect to the longitudinal axis of said slot.

* * * * *